Feb. 4, 1930. M. E. CHENEY 1,745,603
ELECTRICAL INDICATING INSTRUMENT
Filed March 10, 1926
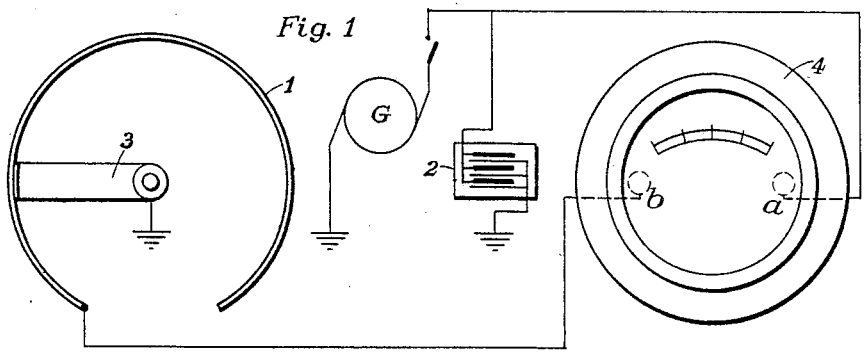
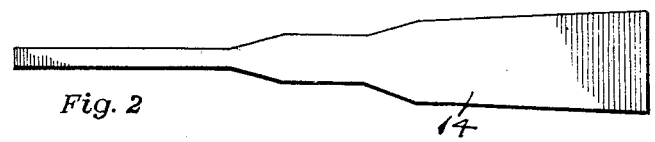
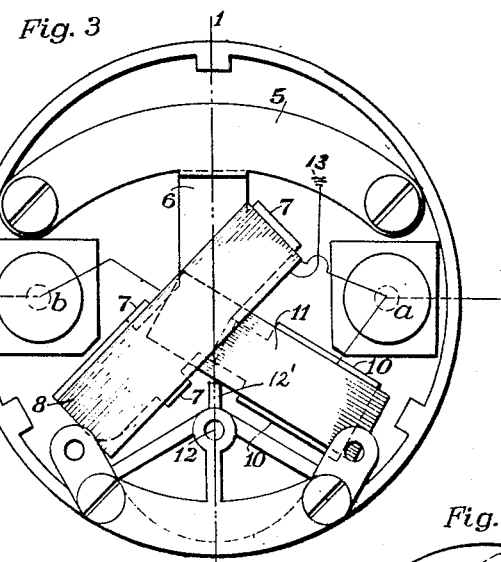
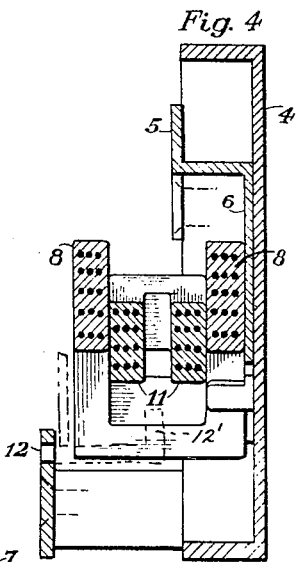
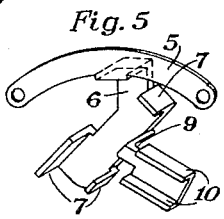
INVENTOR.
Moses E. Cheney
BY
ATTORNEYS.

Patented Feb. 4, 1930

1,745,603

UNITED STATES PATENT OFFICE

MOSES E. CHENEY, OF LA CROSSE, WISCONSIN, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

ELECTRICAL INDICATING INSTRUMENT

Application filed March 10, 1926. Serial No. 93,806.

This invention relates to an improvement in electrical gasolene gauges and particularly relates to an improvement on that type of gauge described in Letters Patent No. 1,522,355 issued to B. F. Winterhoff January 6, 1925 and it is particularly directed to overcoming difficulties met in applying this type of gauge to the various makes of automobiles now on the market. This particular gauge comprises in general a rheostat in circuit with current coils and a source of current, having an armature in the field of said coils and an indicating device connected with said armature. Both the rheostat and the indicating instrument are designed for ready and easy assembly, and in the one case the rheostat arm and in the other the indicating pointer and armature are so arranged as to have the proper movement, due to a new and improved association with other parts of the instrument.

It has been common practise to employ the differential type of galvanometer in electrical gasoline gauges for motor car use wherein two solenoids or coils are used to take care of material variations of the voltage of the current, but difficulty has been experienced in assembling properly the armature and coils to produce uniform increment of pointer movement and furthermore it has been necessary to form the rheostat with a high resistance at one end and a low resistance at the other, in order to obtain this uniform increment of movement, and it has been necessary with a support having high and low resistances at its opposite ends to give to the rheostat arm an eccentric movement, whereas with this improved apparatus the rheostat arm has a movement concentric with the rheostat support, while the uniform increment of pointer movement is maintained throughout its travel. That with this type of electrical instrument the rheostat support must have low resistance at one end and a high resistance at the other to produce uniform increments of pointer movement is best explained by assuming that the constant resistance of the coil in series with the rheostat is 35 ohms. Now, if the rheostat arm or wiper is at the point where the least rheostat resistance is in the circuit, which we assume is nothing, the maximum current will pass through that coil, which we shall assume to be the full position of the tank. Now, at the half full position the current through that coil must be reduced $\frac{1}{2}$, which means that twice the resistance must be applied to that circuit. In other words 35 ohms must be added to the coil resistance. Consequently, the rheostat resistance extending from one end of the support to its half way part must be 35 ohms, but to indicate a $\frac{1}{4}$ full condition the current must be reduced to $\frac{1}{4}$ of its original amount or in other words there must be 4 times the original resistance of 35 ohms which totals 140 ohms, so that from the midway part to the $\frac{1}{4}$ point 70 ohms must be added as compared with only 35 ohms from the mid-point to the opposite end of the rheostat support. Accordingly, in the same space represented by the armature movement from the $\frac{1}{4}$ position to the $\frac{1}{8}$ position an increasingly great resistance amounting to 140 ohms must be added and in the space between the $\frac{1}{8}$ and $\frac{1}{16}$ positions 280 ohms resistance must be added if uniform increments of armature and pointer are to be maintained. All this goes to show that the rheostat support must be designed to take care of this unusual condition, if the uniform increment of pointer movement is to be preserved.

Referring to the drawings, Fig. 1 is a diagrammatic view showing the ordinary type of rheostat in circuit with the battery and voltmeter. Fig. 2 is a detailed view of the spool or support for the rheostat wire. Fig. 3 is a plan view of the voltmeter. Fig. 4 is a transverse sectional view on the line 1—1 of Fig. 3. Fig. 5 is a detailed view of the bracket for supporting coils employed in the voltmeter.

Like parts are indicated by like figures of reference throughout the different views.

Referring to Fig. 1 of the drawings, 1 indicates the rhesostat which is of the ordinary type illustrated in said Letters Patent to Winterhoff excepting that the rheostat wire is wound upon a spool or support which varies in width as indicated in Fig. 2 of this application. It is to be understood that the arm 3 of this rheostat is connected to a float or any other suitable device preferably in the manner fully shown and described in said Winterhoff patent. As heretofore explained, if this arm 3 is to travel with uniform increments of movement from the full tank condition to the ½, ¼, ⅛ and 1/16 positions the windings of the rheostat wire upon the spool or support must be such as to present low resistances at one end and high resistances at the opposite end and the shape of this spool is designed with that end in view. 2 indicates a source of electrical supply, preferably a battery. 4 indicates the voltmeter preferably shown as a magnetically operated instrument containing the novel features hereinafter more fully described. In this instrument there are shown two coils of wire nested together in the manner indicated in Figs. 3 and 4, one coil being placed at an angle to the other coil, and, as indicated in Fig. 4, the air gap in one coil is much wider than the air gap in the other. The coil supporting bracket (Fig. 5) is of peculiar formation and is especially designed to support the two coils and to enable one of the coils to be readily adjusted into the proper angular relation to the other coil for purposes of calibration. The main arm 6 of the bracket is shown as having flanges 7 projecting upwardly therefrom and these flanges are so arranged as to support the main coil 8 on said bracket. A supplemental arm 9 projects from the main bracket arm and it is formed with flanges 10 and so arranged that the supplemental coil 11 will be supported on said supplemental arm and the material of said supplemental bracket is of such character and so proportioned that the relative position of said supplemental coil can be readily changed whereby the instrument can be readily calibrated. One of the advantages in the apparatus described in the claims is that the instrument is readily calibrated, and another advantage is that the instrument is adapted to tanks of various shapes and styles of installation, in some of which the float arm is mounted eccentrically within the tank and by adjusting the head of the device the instrument will fit a great number of tanks. In calibrating this instrument, the pointer may first be set at "Empty," then checked at the half-way point, i. e., the half-full point, and the proper calibration made by merely adjusting the position of the end of the supplemental coil, moving it towards or away from the end of the main coil, then the travel of the pointer may be checked and the length of the travel is corrected by changing the position of the supplemental coil so as to increase or diminish the area of the field and the effective magnetic strength of that field. In this way the apparatus described is susceptible to a very simple and efficient method of calibration. As indicated in Fig. 3 the armature 12' for the voltmeter is mounted at the point 12 and it is so arranged that the armature will move in an arc normally outside of the coil windings but is capable of assuming a position such that portions thereof will extend into the air gap of the coil and thereby cut into the coil windings.

In addition to the fact that the location of the axis 12 for the armature lends itself very well to the arrangement of parts, this location outside the longitudinal plane of the coils, is very advantageous in assembling the parts and avoids the disadvantage of putting any apertures through the coils.

The main coil, which may be termed the magnetic coil, is capable of being connected directly across the electrical circuit of any make of automobile. The other or supplemental coil, together with the rheostat in series, is also directly connected across the electrical circuit, and is capable of being applied to any make of automobile. As indicated in Figs. 1 and 3, the terminal $a$ common to both coils is connected with the "high" or ungrounded side of the battery 2. The other end of the main coil is connected to the other side of the battery through the ground connection 13 (Fig. 3) while the other end of the supplemental coil is attached to post $b$ (Figs. 1 and 3) and through rheostat 1 to rheostat arm 3 to ground, thence to grounded side of battery 2.

It will be apparent that if the armature of the voltmeter revolves in an arc outside of the windings of the coils or cuts into the said windings that it will in effect move in a cross field of magnetic lines of force, some of the lines of force being due to the main or magnetic coil and the other lines of force due to the supplemental coil and will take up positions corresponding with the direction of the resultant of these two magnetic fields. By having the air gaps of the two coils proportioned somewhat as indicated in the drawings and by having the coils placed in angular relation somewhat as indicated in the drawings, it is possible to provide for the proper calibration of the instrument and as the direction of the resultant magnetic field is determined by the relative strengths of the two individual fields, it will necessarily follow that the same variation in direction, time and degree in each of the two individual fields will cause no variation whatever in the direction of the resultant magnetic field. Consequently, it is evident that an instrument constructed as indicated will not be affected by variations in the voltage of the electrical system of the automobile due to a low battery or to the effect of the charging generator.

As indicated in Fig. 2 the wiring for the rheostat is wound about a spool or supporting member marked 14 which is of peculiar formation, the main characteristic being that there is considerable variation in the width of the spool, the object being to enable the wire to be wound thereon so as to get different resistances at various points without changing the sizes of wire or giving the contact arm an eccentric movement.

The operation of the indicating system briefly is as follows:

As previously mentioned, contact arm 3 is moved in accordance with the quantity to be measured, as for example, the depth of gasoline in a tank. Inspection of Figures 1 and 3 will indicate that what has been designated the supplemental coil 11, is in series with the rheostat, and the battery 2, whereby the amount of current passing through said coil and hence the amount of flux surrounding it, will vary in accordance with the amount of resistance cut into the circuit by means of the contact arm 3. On the other hand, coil 8 is connected directly with the battery 2 and its flux is in no wise effected by the operation of the contact arm 3. Movement of said arm 3, however, will cause the armature 12' to move, due to the change in flux which it produces in the coil 11 and hence gives an indication of the depth of gasoline, for example, in the tank. It will also be evident that not only will change in resistance in rheostat 1 produce movement of the pointer, but were it not for coil 8, change in battery voltage would also change in the pointer reading and hence introduce an error therein. By the action of coil 8, however, any change in flux of coil 11 due to change in battery voltage is compensated for by a corresponding change in the flux and coil 8, and hence change in battery voltage is without substantial effect upon the pointer.

Subject matter shown and not claimed herein is claimed in the divisional and copending applications Serial No. 290,173 which relates to the combination of coils and rheostat; Serial No. 295,952 which relates to the rheostat itself and Serial No. 257,816 which relates to the relative positioning of the coils and the relative positioning of coils and armature.

Having described the invention, I claim as follows:

1. In an instrument of the character described the combination of two solenoids, one partially nested within the other, with an armature rotatably mounted at a fixed point outside both solenoids in an unenclosed field adjacent said solenoids, one of said solenoids being adjustably mounted, whereby its relation to its companion solenoid and to said armature may be changed.

2. In a differential galvanometer the combination of two coils, bracket means for supporting said coils with the coils arranged at an angle to each other, and an armature pivoted adjacent said coils, said bracket means being of such construction as to permit bending thereof for adjusting the relative position of one of said coils.

3. In an instrument of the character described, the combination of two coils, bracket means for supporting said coils angularly positioned with respect to each other, an armature pivoted in the enclosed angle and externally of each of the individual coils, said bracket being of a construction to permit bending thereof to vary the angular relation of said coils and the relation of at least one of said coils with respect to the armature.

In testimony whereof, I have hereunto set my hand this 23d day of February, 1926.

MOSES E. CHENEY.